(12) United States Patent
Horton et al.

(10) Patent No.: US 7,098,172 B1
(45) Date of Patent: Aug. 29, 2006

(54) PREVENTION AND TREATMENT OF LOST CIRCULATION WITH CROSSLINKED POLYMER MATERIAL

(75) Inventors: Robert L. Horton, Sugar Land, TX (US); Bethicia Prasek, Houston, TX (US); Frederick B. Growcock, Houston, TX (US); John W. Vian, Deer Park, TX (US); Catalin D. Ivan, Sugar Land, TX (US)

(73) Assignee: M-I L.L.C., Houston, TX (US)

( * ) Notice: Subject to any disclaimer, the term of this patent is extended or adjusted under 35 U.S.C. 154(b) by 223 days.

(21) Appl. No.: 10/455,636

(22) Filed: Jun. 5, 2003

Related U.S. Application Data

(60) Provisional application No. 60/386,620, filed on Jun. 5, 2002.

(51) Int. Cl.
*C09K 8/04* (2006.01)

(52) U.S. Cl. ............ 507/128; 507/129; 507/135; 507/140; 507/237; 507/239; 507/259; 507/271; 507/272; 166/305.1; 175/72

(58) Field of Classification Search ............ 507/110, 507/120, 128, 145, 211, 225, 237, 271, 272, 507/277, 903; 175/72
See application file for complete search history.

(56) References Cited

U.S. PATENT DOCUMENTS 3,208,523 A * 9/1965 Coyle et al. ............ 166/292
3,502,149 A * 3/1970 Pence, Jr. ............... 277/316
4,643,255 A * 2/1987 Sandiford et al. ........ 166/295
4,655,943 A * 4/1987 Elmquist et al. ......... 507/226
4,957,166 A   9/1990 Sydansk ................. 166/295
5,062,969 A   11/1991 Holtmyer et al. ........ 252/8.551
5,080,809 A * 1/1992 Stahl et al. ............. 507/221
5,304,620 A * 4/1994 Holtmyer et al. ........ 527/310
5,363,916 A * 11/1994 Himes et al. ........... 166/276
5,439,057 A * 8/1995 Weaver et al. .......... 166/295
5,680,900 A * 10/1997 Nguyen et al. .......... 166/295
5,701,956 A * 12/1997 Hardy et al. ............ 166/295
5,762,140 A * 6/1998 Hardy et al. ............ 166/295
6,242,390 B1 * 6/2001 Mitchell et al. ......... 507/211
2003/0109385 A1 * 6/2003 Gunn et al. ............. 507/200

* cited by examiner

*Primary Examiner*—Philip Tucker
*Assistant Examiner*—Charles R. Richard
(74) *Attorney, Agent, or Firm*—Carter J. White

(57) ABSTRACT

A process to substantially reduce fluid loss in which an appropriate amount of a non-flowing gel of sufficient strength is emplaced to substantially eliminate or reduce loss of the drilling fluid. The gel composition of the process includes: (1) a non-cellulose containing copolymer having vinyl phosphonate co-monomer units which may be incorporated into the polymer by copolymerization with the other co-monomer(s) comprising the polymer or by grafting upon an already existing polymer or co-polymer, (2) a crosslinking agent active upon the phosphonate groups, (3) a crosslinking initiator comprising a Bronsted Lowry base or Lewis base and (4) an aqueous solvent.

5 Claims, No Drawings

PREVENTION AND TREATMENT OF LOST CIRCULATION WITH CROSSLINKED POLYMER MATERIAL

This is a non-provisional application based on U.S. provisional application No. 60/386,620, filed Jun. 5, 2002, the contents of which are incorporated herein by reference.

BACKGROUND

A drilling fluid is circulated from an earthen surface down through a drilled out wellbore to a drilling face and back to the surface when drilling into a subterranean formation in pursuit of economically recoverable hydrocarbons. Drilling fluids are specifically designed to perform a number of functions, including cooling and lubricating the drill bit, removing drill cuttings from the wellbore, supporting a part of the weight of the drill pipe and drill bit, providing a hydrostatic head to maintain the integrity of the wellbore walls and control the well, preventing significant flow of fluids across the wellbore face into the wellbore and vice versa, and minimizing or eliminating damage to the reservoir.

A common problem encountered during drilling operations is "lost circulation", which is the excessive flow of drilling fluids out of the wellbore. The drilling fluids are either lost to the formation matrix or to voids in direct communication with the wellbore. Lost circulation is undesirable from an economic standpoint because it requires one to continually replenish the wellbore with costly drilling fluid. Lost circulation is also undesirable from an operational and safety standpoint because it can destabilize permeable formations and damage the pay zone, and in extreme cases it can result in a blowout of the hydrocarbon zone followed by a well fire.

After drilling, the well construction operations move into a "completion" phase wherein the drilling fluid may continue to be used in the well or it may be displaced and a completion fluid or completion brine emplaced to take over some of the roles of the drilling fluid, especially well control, while enabling other functions for which the drilling fluid may not be ideally suited. The well control aspect described above, of course, must be addressed continuously to avoid destabilizing permeable formations, damaging the pay zone, and leading in extreme cases to a blowout of the hydrocarbon zone followed by a well fire. During completion operations, the need to avoid losses of fluid during circulation continues, but it also broadens to include the need to avoid excessive fluid loss during periods in which fluids are no longer circulated. The term used to cover this broadened functionality is "fluid loss control" but it should be emphasized that fluid loss control and lost circulation control are very similar technologies. Therefore, the teachings in accordance with the present invention can be utilized in fluid loss control during completions in much the same fashion and using much the same materials as in lost circulation during drilling.

Drilling fluids are typically formulated to contain one or more viscosifiers, such as polymeric additives, which, among other things, can help to control lost circulation. Often specific substances are administered—either as additional components of the drilling fluid or as distinct fluids—to inhibit the flow of drilling fluids from the wellbore into the formation; these are termed "lost circulation materials" or "lost circulation treatments".

Unfortunately many lost circulation treatments known in the art are unsatisfactory because of operational limitations restricting their utility. For example, some lost circulation treatments are ineffective in the presence of high salt concentration brines. Others undergo thermal degradation when subjected to high operational temperatures. The most significant shortcoming of conventional lost circulation treatments is their inability to effectively control lost circulation encountered when drilling through voids occurring in the formation.

Thus, a need exists for a lost circulation treatment using a material that effectively prevents or reduces lost circulation of drilling fluids, particularly in cases where conventional lost circulation materials are ineffective. Further, a need exists for a lost circulation treatment which has sufficient strength and integrity to minimize lost circulation into voids in direct communication with the wellbore, such as fractures, fracture networks, vugs, washouts, cavities, and the like.

SUMMARY

The claimed subject matter relates generally to the exploitation of hydrocarbon-containing formations and a process for drilling into a subterranean hydrocarbon bearing formations. More particularly, the claimed subject matter relates to a process for minimizing fluid loss and lost circulation of a drilling fluid when drilling into a subterranean hydrocarbon bearing formation. Yet more specifically, the claimed subject matter relates to the fields of fluid rheology, thickeners, viscosifiers, viscoelastic fluids, drilling fluids, well fracturing fluids, well treatment fluids, fluid control pills, fluid loss and lost circulation material.

One of skill in the art should appreciate that the claimed subject matter includes a process for substantially retarding the loss of fluid, and/or lost circulation of a drilling fluid across a face in a formation while drilling a wellbore in the formation having a matrix below an earthen surface, in which the process includes: a) admixing components of a gel, the gel including a non-cellulose containing copolymer having at least one phosphonate group, a crosslinking agent active upon the phosphonate group, a crosslink initiator and an aqueous solvent for the polymer and the crosslinker; b) injecting the gel into the wellbore and placing the gel at a face in direct communication with the wellbore; and c) forming a non-flowing gel from the gel at the face to prevent significant lost circulation across the face.

In one illustrative embodiment the non-cellulose-containing copolymer is an acrylamide-co-vinylphosphonate. For another illustrative embodiment, the non-cellulose containing co-polymer is a copolymer comprising monomers selected from the group consisting of: vinyl phosphonate, bis-(b-chloroethyl vinyl phosphonate) {also known as bis (2-chloroethyl) vinylphosphonate}, bis (hydrocarbyl) vinylphosphonate, 1,1-dichlorovinylethyl phosphate, 1,1-dichlorovinylethyl phosphate, triethanolamino-bis-chlorophosphoric acid, hydrophilic monomers of the formula:

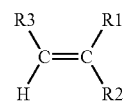

in which R1 is hydrogen, methyl or ethyl, and R2 is the group COOR4, a sulfonyl group, a phosphonyl group, a phosphonyl group esterified by ($C_1$–$C_4$) alkanol or a group of the formula:

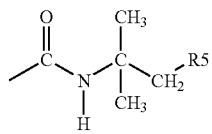

and R3 is hydrogen, methyl, ethyl or the carboxyl group; and R4 is hydrogen, amino or hydroxy ($C_1$–$C_4$) alkyl, and R5 is a sulfonyl group, a phosphonyl group or a carboxyl group, or grafting (co)polymerization of one or more hydrophilic monomers of the formula I onto a grafting base, using a free radical initiator which forms three or more free radical sites per molecule, or monomers of the formula:

$X_2O_3PCHYCZ_2PO_2XH$ in which X is H, alkali metal or ammonia, Y and Z are each H, $PO_3X_2$, $SO_3X$ or $CO_2X$ (e.g., vinyl phosphonic acid or vinylidene diphosphonic acid) or groups which react with hypophosphorous acid in the presence of free radicals providing compounds $X_2O_3PCHYCZ_2PO_2XH$ as well as combinations of these a similar compounds that should be known to one of skill in the art The illustrative process may be carried out such that the crosslinking agent is selected from: divalent cations, trivalent cations, tetravalent cations as well as combinations of these and similar compounds that should be known to one of skill in the art. One preferred and illustrative embodiment utilizes a divalent, trivalent, or tetravalent cations are selected from: $Mg^{2+}$, $Ca^{2+}$, $Fe^{2+}$, $Cd^{2+}$, $Cu^{2+}$, $UO_2^{2+}$, $PbO^{2+}$, $Al^{3+}$, $Fe^{3+}$, $Ce^{3+}$, $Sn^{4+}$, as well as combinations of these a similar compounds that should be known to one of skill in the art. Alternatively, the illustrative process may use a crosslinking agent that includes a stoichiometrically-limited amount of $Cr^{3+}$ or other chromium-containing moiety which is less than or approximately equal to the amount of $Cr^{3+}$ or other chromium-containing moiety needed to react on a 1:1 basis stoichiometrically with the vinyl phosphonate groups in the polymer. The illustrative process utilizes a crosslink initiator that is generally selected from Bronsted Lowry bases and Lewis bases, as well as combinations of these and similar compounds that should be known to one of skill in the art.

In addition one of skill in the art should, based on the present disclosure, understand and appreciate that the claimed subject matter includes the composition utilized in the above process.

These and other features of the claimed subject matter are more fully set forth in the following description of illustrative embodiments.

DESCRIPTION OF ILLUSTRATIVE EMBODIMENTS

The claimed subject matter provides a process for preventing or reducing fluid loss or lost circulation when drilling by conventional methods into a subterranean formation. The process employs a continuous, non-flowing, solid, crosslinked, polymer gel, in a lost circulation treatment. In one illustrative embodiment of the treatment, the non-flowing gel is placed in the wellbore or voids as a preventive before lost circulation occurs. In another illustrative embodiment, the non-flowing gel is placed in the wellbore or voids in a remedial role only after fluid loss or lost circulation has been detected.

The utility of the present process is attributable to the specific composition of the gel used in the lost circulation treatment. The polymer gel composition comprises (1) a non-cellulose-containing copolymer that contains phosphonate groups, (2) a crosslinking agent active upon the phosphonate groups, (3) a crosslink initiator comprising a Bronsted-Lowry base or Lewis base, which is substantially free of polyvalent metal ions, and is added to the gel in an amount sufficient to effect crosslinking of the copolymer and (4) an aqueous solvent. The gel constituents are premixed at the surface and injected into a wellbore in a flowing condition. The gel components crosslink to completion in-situ to form a continuous non-flowing gel, which effectively inhibits the flow of drilling fluid from the wellbore into voids or the formation matrix. The gel is relatively non-damaging to the formation matrix and can be un-crosslinked if desired.

The gel employed in the claimed subject matter has utility over a broad range of operating conditions. The gel is effective in the presence of high salt concentration brines and is resistant to thermal degradation at temperatures generally encountered during drilling operations. Furthermore, the gel can be formulated over a very broad range of onset times and strengths. Nevertheless, the gel is relatively insensitive to minor variations in conditions under which it is formulated. Thus, the gel is readily suited for on-site preparation in the field where process controls are often imprecise, such as remote hostile onshore and offshore locations.

In addition to the above recited operational advantages, the gel employed in the claimed subject matter can offer practical advantages over lost circulation treatments known in the art. The present process is cost effective because the gel components are readily available and relatively inexpensive. The gel can be applied with conventional oil field equipment. Finally, the gel composition is relatively non-toxic to the environment and safe to handle.

As noted above, the process is initiated by formulating a flowing gel composition at the surface that is a precursor to a non-flowing crosslinked polymer gel. The term "crosslinked polymer gel" as used herein is directed to a continuous three-dimensional polymeric network having a high average molecular weight, that is to say an average molecular weight in the range of about 10,000 to about 50,000,000 Daltons. The polymer network is the result of crosslinking one or more polymer molecules. The crosslinked gel has a liquid medium such as water that is contained within the polymeric network. It is believed that the unique containment of the liquid medium in the polymer network provides a gel upon complete gelation that is characterized as "non-flowing".

One of skill in the art should appreciate that, generally, non-flowing gels do not fully conform to the shape of their container, but may deform somewhat under the force of gravity. In contrast, flowing gels fully conform to the shape of their containers. Non-flowing gels range in properties from highly deformable or elastic gels to rigid or ringing gels.

The gel composition of the present process comprises (1) a non-cellulose-containing copolymer preferably containing phosphonate groups, (2) a crosslinking agent preferably active upon the phosphonate groups, (3) a crosslink initiator comprising a Bronsted-Lowry base or Lewis base, which is substantially free of polyvalent metal ions, and which is preferably added in an amount sufficient to effect crosslinking of the copolymer and (4) an aqueous solvent. The non-cellulose-containing polymer is a crosslinkable water-soluble polymer having one or more phosphonate groups or phosphonate derivatives or, alternatively, having one or more groups capable of being converted to phosphonate groups. The non-cellulose-containing polymer satisfying these criteria may be either a synthetic polymer or a biopolymer. The average molecular weight of the non-cellulose-containing polymer is in the range of about 10,000 to about 50,000,000, preferably about 100,000 to about 20,000,000 and most preferably about 150,000 to about 15,000,000.

If the polymer is a synthetic polymer, it may preferably be a copolymer comprising monomers such as, for example, vinyl phosphonate, bis-(β-chloroethyl vinyl phosphonate) {also known as bis(2-chloroethyl) vinylphosphonate}, bis (hydrocarbyl) vinylphosphonate, 1,1-dichlorovinylethyl phosphate, 1,1-dichlorovinylethyl phosphate, triethanolamino-bis-chlorophosphoric acid, hydrophilic monomers of the formula:

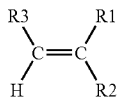

in which R1 is hydrogen, methyl or ethyl, and R2 is the group —COOR4, a sulfonyl group, a phosphonyl group, a phosphonyl group esterified by (C1–C4)-alkanol or a group of the formula:

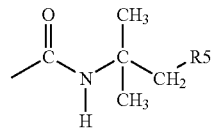

and R3 is hydrogen, methyl, ethyl or the carboxyl group; and R4 is hydrogen, amino or hydroxy-($C_1$–$C_4$)-alkyl, and R5 is the sulfonyl group, the phosphonyl group or the carboxyl group, or grafting (co)polymerization of one or more hydrophilic monomers of the formula I onto a grafting base, using a free radical initiator which forms three or more free radical sites per molecule, or monomers of the formula:

$X_2O_3PCHYCZ_2PO_2XH$ in which X is H, alkali metal or ammonia, Y and Z are each H, $PO_3X_2$, $SO_3X$ or $CO_2X$ (e.g., vinyl phosphonic acid or vinylidene diphosphonic acid) or groups which react with hypophosphorous acid in the presence of free radicals providing compounds $X_2O_3PCHYCZ_2PO_2XH$ which react with monomers such as vinyl sulfonate, vinylphosphonate, vinylidene diphosphonate and acrylic acid.

We define "a crosslinking agent active upon the phosphonate groups" by analogy to the definitions found in U.S. Pat. Nos. 5,062,969 and 4,957,166. The principal difference is that we have found that a crosslinking agent, in order to be "active upon the phosphonate groups" also requires a crosslinking initiator agent comprising a Bronsted-Lowry base or Lewis base added to the gel in an amount sufficient to effect crosslinking of the copolymer. Thus it is the combination of crosslinking agent and crosslinking initiator that react and thus crosslink the phosphonate groups of the polymer.

An especially preferred polymer of the claimed subject matter is an acrylamide-co-vinylphosphonate copolymer, which is defined herein as a crosslinkable, water-soluble, synthetic polymer containing one or more phosphonate groups. Useful acrylamide polymers include polyacrylamide-co-vinylphosphonate, partially hydrolyzed polyacrylamide-co-vinylphosphonate, terpolymers containing acrylamide, vinylphosphonate, and a third species and quaterpolymers containing acrylamide, acrylate, vinylphosphonate, and a fourth species. As defined herein, polyacrylamide (PA) is an acrylamide polymer having substantially less than 1% of the acrylamide groups in a carboxylate form. Partially hydrolyzed polyacrylamide (PHPA) is an acrylamide polymer having at least 1%, but not 100%, of the acrylamide groups in a carboxylate form. The acrylamide polymer may be prepared according to any conventional method known in the art.

The crosslinking agent of the first embodiment of the claimed subject matter is a divalent, trivalent, or tetravalent cation such as, for example, $Mg^{2+}$, $Ca^{2+}$, $Fe^{2+}$, $Cd^{2+}$, $Cu^{2+}$, $UO_2^{2+}$, $PbO^{2+}$, $Al^{3+}$, $Fe^{3+}$, $Ce^{3+}$, $Sn^{4+}$, and the like. A preferred crosslinking agent of the claimed subject matter is a trivalent transition metal cation such as, for example, $Fe^{3+}$, $Ce^{3+}$, and the like. However, because of its environmentally related toxicity, Cr(III) salts and other chromium-containing moieties are not preferred in accordance with the claimed subject matter. $Mg^{2+}$, $Ca^{2+}$, and $Fe^{3+}$ are particularly preferred crosslinking agents in one illustrative embodiment of the claimed subject matter.

An alternative illustrative embodiment of the claimed subject matter includes a stoichiometrically-limited amount of $Cr^{3+}$ or other chromium-containing moiety as the crosslinking agent. This is done to minimize over-crosslinking, which often has detrimental effects, by limiting the amount of $Cr^{3+}$ or other chromium-containing moiety in the formulation. The use of $Cr^{3+}$ or other chromium-containing moiety as crosslinking agents for acrylic co-polymers has been reported in the literature. For example see U.S. Pat. No. 4,975,166. However one of skill in the art will appreciate that this reference does not include vinyl phosphonates; as does in the present alternative illustrative embodiment. It should also be noted that a stoichiometrically-limited amount of $Cr^{3+}$ or other chromium-containing moiety will be needed to crosslink the vinyl phosphonate co-monomers in an acrylic co-polymer that does include vinyl phosphonates. Not in accordance with the present alternative embodiment of the claimed subject matter, this co-polymer could be further crosslinked with relatively higher concentrations of $Cr^{3+}$ or other chromium-containing moiety, because the higher concentrations would first crosslink at the vinyl phosphonate sites and then further crosslink at the acrylic co-monomer sites. This further crosslinking is not necessary (and may, in fact be detrimental) to use the crosslinked product co-polymers in treating or preventing lost circulation; furthermore, this further crosslinking requires higher concentrations of $Cr^{3+}$ or other chromium-containing moiety, and is therefore undesirable environmentally.

In the above-mentioned alternative embodiment of the claimed subject matter, we define the term "a stoichiometrically-limited amount of $Cr^{3+}$ or other chromium-containing moiety" as that amount which is less than or approximately equal to the amount of $Cr^{3+}$ or other chromium-containing moiety needed to react on a 1:1 basis stoichiometrically with the vinyl phosphonate groups in the copolymer. Similarly, we define the term, a "relatively higher concentrations of $Cr^{3+}$ or other chromium-containing moiety" as that amount which is substantially greater than the amount of $Cr^{3+}$ or other chromium-containing moiety needed to react on a 1:1 basis stoichiometrically with the vinyl phosphonate groups in the copolymer, because the higher concentrations would not only crosslink at the vinyl phosphonate sites but also further crosslink at the acrylic co-monomer sites.

The gel composition of the claimed subject matter is formed by admixing the copolymer, crosslinking agent, crosslink initiator and an aqueous solvent at the surface. Surface admixing broadly encompasses inter alia mixing the gel components in bulk at the surface prior to injection or simultaneously mixing the components at or near the wellhead by in-line mixing means while injecting them.

Generally, the gel is required to have sufficient strength to substantially eliminate or reduce fluid loss and/or lost circulation of a drilling fluid when an appropriate amount of the gel is placed in the wellbore. By "reducing fluid loss", it is meant that the degree of penetration or loss of the wellbore fluid into a formation is substantially reduced using the formulations of the present disclosure as compared to the absence of the non-flowing gel treatment. By "reducing lost circulation", it is meant that the degree of lost circulation experienced when using a drilling fluid after a non-flowing gel treatment is less than the degree of lost circulation experienced when a conventional drilling fluid is used in the absence of the non-flowing gel treatment. The strength of the gel can be enhanced by the suspension of inert solids in the gel, including inert insoluble inorganic solids such as sand and fiberglass or inert insoluble organic solids such as cellulosic and plastic fibers.

After the gel composition has been formulated in the above-described manner, it is injected as a partial gel into the wellbore being treated. The partial gel is placed at a face or in voids where it is desired to prevent or remedy lost circulation and the partial gel goes to complete gelation, setting up as a non-flowing gel. Placement of the gel can be facilitated by the use of zone isolation packers if desired.

A "partial gel" as referred to herein has at least one chemically crosslinked site. The partial gel may or may not manifest the physical properties of a crosslinked gel, but the partial gel is capable of further crosslinking to completion in situ, resulting in a gel having the desired properties without the addition of more crosslinking agent. The partial gel preferably has sufficient viscosity and/or plugging efficiency to at least substantially reduce gel leakoff into the formation during or subsequent to its placement.

"Complete gelation" means that the gel composition is non-flowing and is incapable of further crosslinking because one or both of the required reactants in the initial solution are consumed. That is to say further crosslinking is only possible if more polymer, more crosslinking agent, or both are added to the gel composition.

The claimed subject matter can be practiced according to a number of different embodiments. In one embodiment of the claimed subject matter, the gel is placed in the wellbore or in voids in direct communication with the wellbore after at least a portion of the wellbore has been drilled out by a conventional drilling operation, but before any significant lost circulation is detected. Drilling is suspended during placement of the gel and resumes after gelation is complete. The gel in place acts as a lost circulation preventive.

In another embodiment of the claimed subject matter, the gel is employed in a remedial role. When fluid loss and/or lost circulation is detected during a drilling operation using a conventional drilling fluid, drilling is suspended and the gel is placed in the wellbore or in voids in direct communication with the wellbore. Once the gel is in place, drilling is resumed with the gel eliminating or reducing further lost circulation. Upon resumption of drilling, it may be necessary to drill through residual gel that has set up in the bore hole. However, this will not substantially impede the wellbore drilling operation.

In a similar embodiment, the gel may be utilized in a remedial role after the failure of a conventional lost circulation treatment. For example, if large volumes of a conventional lost circulation material, such as Portland cement, are being lost to voids in direct communication with the wellbore and there is little apparent reduction in lost circulation, the conventional treatment is deemed ineffective. Therefore, the treatment process of the claimed subject matter is performed in the same manner as described above to effectively plug the voids where the conventional treatment has failed.

This embodiment may by further augmented by subsequently placing the conventional Portland cement adjacent to the gel once the gel has set up in the voids. The gel prevents the Portland cement from being lost into voids, while the Portland cement enhances the strength of the gel plug.

The amount of gel employed in the present process is dependent on the geological properties of the formation as well as the drilling operating conditions. The most common applications for the present process are expected to be situations where voids in direct communication with the wellbore are encountered during drilling. In such cases large volumes of gel (on the order of 500 barrels or more) may be required to practice the process of the claimed subject matter. Where no voids are encountered during drilling, a considerably smaller volume of gel may be required to inhibit lost circulation.

It is believed the gel functions to plug faces and voids according to the lost circulation treatment of the claimed subject matter by coating the faces and at least partially filling the voids, which are in direct communication with the wellbore. In doing so, the gel prevents or reduces the flow of drilling fluids out of the wellbore into the matrix or voids in direct communication with the wellbore.

The following definitions apply to the claimed subject matter. "Plugging" is a substantial reduction in permeability. The term "face" includes the walls of the wellbore and the walls or boundaries of voids in direct communication with the wellbore. The "wellbore" is the bore hole formed by the drill bit in the formation. "Voids" are not formed by the drill bit, but are nevertheless anomalies having a permeability substantially similar to that of the bore hole relative to that of the matrix. Voids include fractures, fracture networks, caverns, vugs, cavities, washouts, cobble packs, unconsolidated sands, and the like, which may extend far away from the wellbore and may be naturally occurring or induced by the drilling operation. The "matrix" is homogeneous, continuous, sedimentary material having a permeability that is substantially less than that of the wellbore or voids. "Direct communication" means that the voids are not separated from the wellbore by intervening matrix.

After the drilling operation is completed, the well may be utilized for its intended purpose, i.e., recovery of hydrocarbon fluids from the formation or injection of fluids into the formation. Since the gel does not significantly penetrate the formation matrix beyond a distance on the order of about 1 centimeter from the rock-face, the gel is non-damaging to the formation matrix to the extent that it does not substantially inhibit subsequent recovery or injection of fluids. Even if the gel were to inhibit unacceptably the recovery or injection of fluids, the problem can be remedied by perforating the matrix beyond the layer of gel penetration.

If removal of residual gel from the wellbore or voids is desired, it can be readily accomplished because the gels employed in the process of the claimed subject matter are generally reversible. The gels can be reversed with a reduction in pH of the gel and/or by the application of a conventional oxidative breaker, such as peroxides, hypochlorites or persulfates. The breaker can be incorporated into the initial gel composition at the surface to slowly break the gel over time, as, for example, through the use of encapsulated citric acid or a chemically or thermally delayed oxidative breaker; or the breaker can be placed in the wellbore separately to reverse the gel on contact at the desired time.

While the apparatus, compositions and methods disclosed above have been described in terms of preferred or illustrative embodiments, it will be apparent to those of skill in the art that variations may be applied to the apparatus, compositions and methods described herein without departing from the concept and scope of the claimed subject matter. All such similar substitutes and modifications apparent to those skilled in the art are deemed to be within the scope and concept of the subject matter as it is set out in the following claims.

What is claimed is:

1. A process for preventing lost circulation of a drilling fluid to a formation penetrated by a wellbore in the formation while drilling below an earthen surface, the process comprising:

(a) stopping the drilling of the hole including stopping the circulation of drilling fluid in the wellbore;

(b) admixing components of a flowing gel pill, the pill including a non-cellulose-containing copolymer having at least one phosphonate group, a crosslinking agent active upon the phosphonate group, a crosslink initiator, wherein the crosslink initiator is selected from the group consisting of Bronsted-Lowry bases, Lewis bases, or combinations thereof, wherein the crosslink initiator is substantially free of polyvalent metal ions, and an aqueous solvent for the polymer and the crosslinker, wherein the non-cellulose containing co-polymer is a copolymer comprising monomers selected from the group consisting of: vinyl phosphonate, bis-(β-chloroethyl vinyl phosphonate), bis (hydrocarbyl) vinylphosphonate, 1,1-dichlorovinylethyl phosphate, 1,1-dichlorovinylethyl phosphate, triethanolamino-bis-chlorophosphoric acid, hydrophilic monomers of the formula:

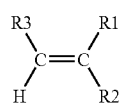
    (I)

in which R1 is hydrogen, methyl or ethyl, and R2 is the group —COOR4, a sulfonyl group, a phosphonyl group, a phosphonyl group esterified by (C1–C4)-alkanol or a group of the formula:

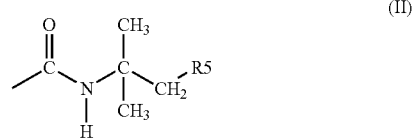
    (II)

and R3 is hydrogen, methyl, ethyl or the carboxyl group; and R4 is hydrogen, amino or hydroxy-$(C_1-C_4)$-alkyl, and R5 is a sulfonyl group, a phosphonyl group or a carboxyl group, or grafting (co)polymerization of one or more hydrophilic monomers of the formula I onto a grafting base, using a free radical initiator which forms three or more free radical sites per molecule, or monomers of the formula:

$$X_2O_3PCHYCZ_2PO_2XH \qquad (III)$$

in which X is H, alkali metal or ammonium, Y and Z are each H, $PO_3X_2$, $SO_3X$ or $CO_2X$ and combinations thereof;

(c) injecting the flowing gel pill into the wellbore and resuming the circulation of the drilling fluid in the wellbore for a predetermined time period, thereby placing the gel pill at a wellbore face in direct communication with the formation; and (d) forming a nonflowing gel from the flowing gel pill at the face so as to stop the loss of the drilling fluid into the formation;

(e) resuming the drilling of the hole including the circulation of the drilling fluid in the wellbore.

2. The process of claim 1, wherein the non-cellulose-containing copolymer is an acrylamide-co-vinylphosphonate.

3. The process of claim 1, wherein the crosslinking agent is selected from the group consisting of: divalent cations, trivalent cations, tetravalent cations or combinations thereof.

4. The process of claim 3, wherein the divalent, trivalent, or tetravalent cations are selected from the group consisting of $Mg^{2+}$, $Ca^{2+}$, $Fe^{2+}$, $Cd^{2+}$, $Cu^{2+}$, $UO_2^{2+}$, $PbO^{2+}$, $Al^{3+}$, $Fe^{3+}$, $Ce^{3+}$, $Sn^{4+}$, or combinations thereof.

5. The process of claim 1, wherein the flowing gel pill has a pH value between about 8 and about 12.

* * * * *